United States Patent [19]

Rasmussen et al.

[11] Patent Number: 4,520,970

[45] Date of Patent: Jun. 4, 1985

[54] CARTRIDGE TAPE DRIVE HAVING VACUUM AUTO-THREADING

[75] Inventors: Donald O. Rasmussen, Arcadia; William C. Chow, West Covina; Franklin J. Davio, Burbank, all of Calif.

[73] Assignee: Kennedy Company, Monrovia, Calif.

[21] Appl. No.: 538,426

[22] Filed: Oct. 3, 1983

[51] Int. Cl.³ .................... G03B 1/04; G11B 15/32
[52] U.S. Cl. ...................... 242/195; 226/92; 226/97
[58] Field of Search .............. 242/195, 197–200, 242/182; 226/91, 92, 95, 97; 360/95, 96.5, 132, 137

[56] References Cited

U.S. PATENT DOCUMENTS

| | | | |
|---|---|---|---|
| 3,127,120 | 3/1964 | Selsted et al. | 242/55.12 |
| 3,134,527 | 5/1964 | Willis | 226/97 |
| 3,334,831 | 8/1967 | Bradt | 242/55.13 |
| 3,795,371 | 3/1974 | Tolini et al. | 242/182 |
| 3,823,895 | 7/1974 | Jones et al. | 242/186 |
| 3,863,863 | 2/1975 | Ende | 242/182 |
| 3,910,526 | 10/1975 | Mosciatti | 242/182 |
| 4,243,186 | 1/1981 | Peter et al. | 242/195 |

Primary Examiner—Leonard D. Christian
Attorney, Agent, or Firm—Fraser and Bogucki

[57] ABSTRACT

In a magnetic tape drive in which the supply reel is contained within a cartridge, the tape is automatically threaded from the supply reel within the cartridge past a magnetic head assembly to the take-up reel by a vacuum source coupled via apertures in the hub of the take-up reel to a generally enclosed continuous flowpath extending between the supply and take-up reels. The vacuum source causes air to flow into the cartridge through air inlet ports and around the opposite sides of the supply reel to an opposite tape exit port communicating with the flowpath so as to pull the leading end of a length of magnetic tape wound on the supply reel through the flowpath and onto the take-up reel. The supply reel is initially rotated in a second direction to ensure that the length of magnetic tape is completely wound thereon, following which the supply reel is rotated in an opposite first direction to enable the leading end of the length of tape to be picked off the supply reel and fed into the flowpath to the take-up reel. The take-up reel is rotated in a second direction opposite the first direction. The tape cartridge has a door in the housing thereof which closes over the tape exit port when the cartridge is removed from the magnetic tape drive.

20 Claims, 17 Drawing Figures

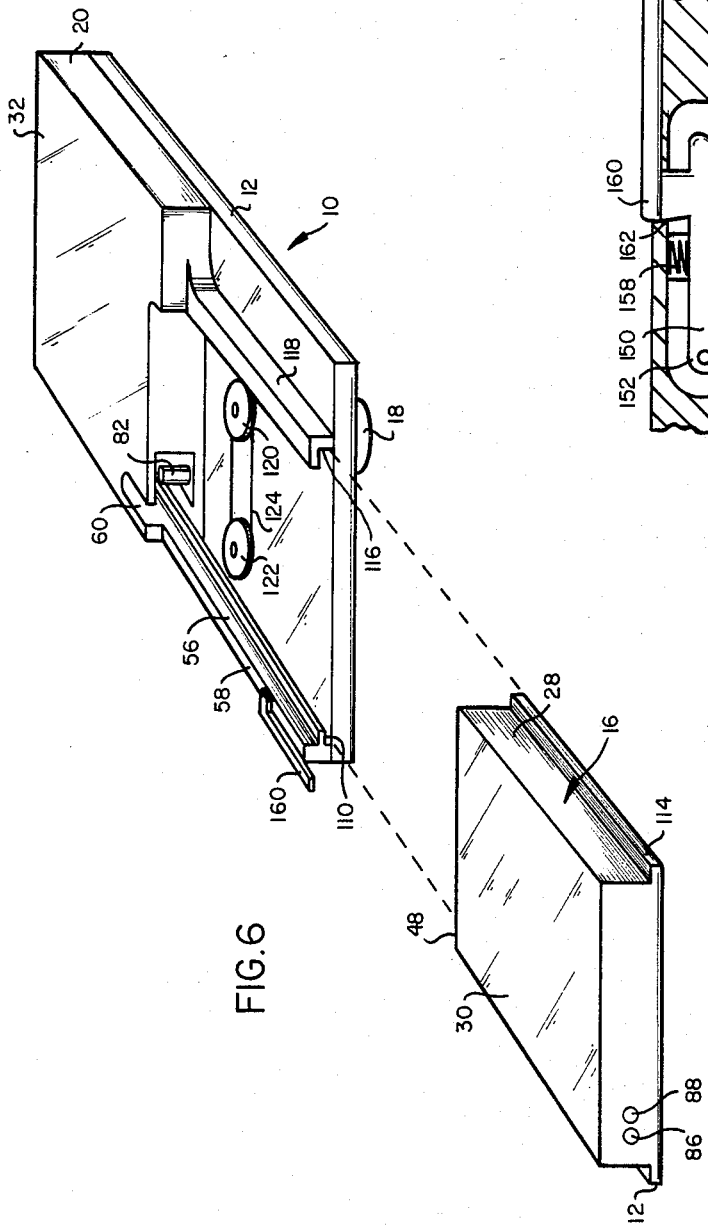
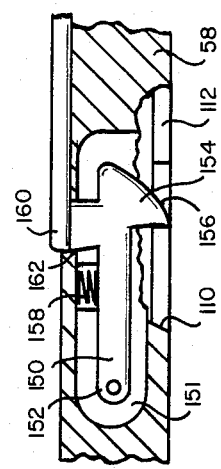

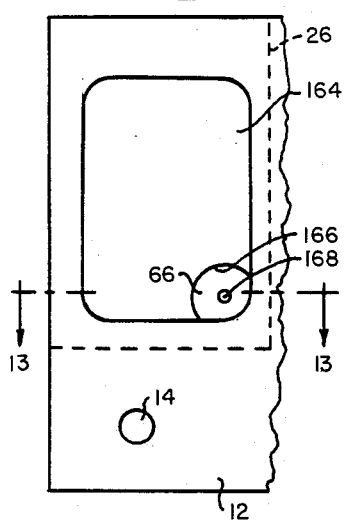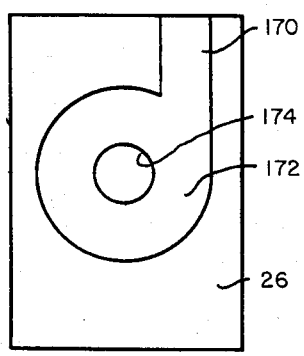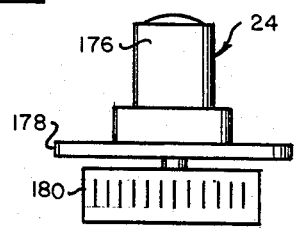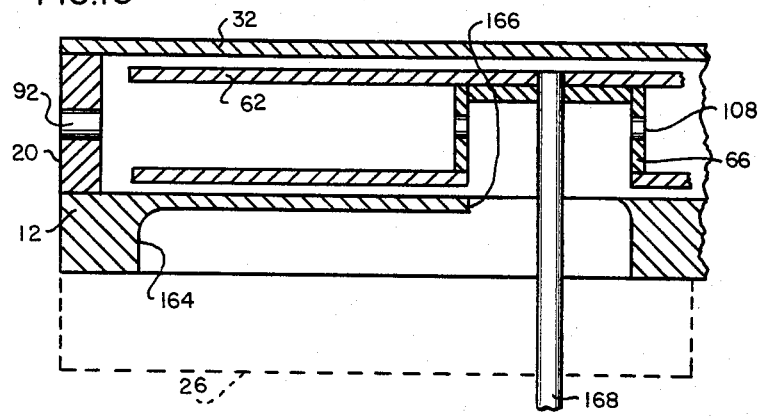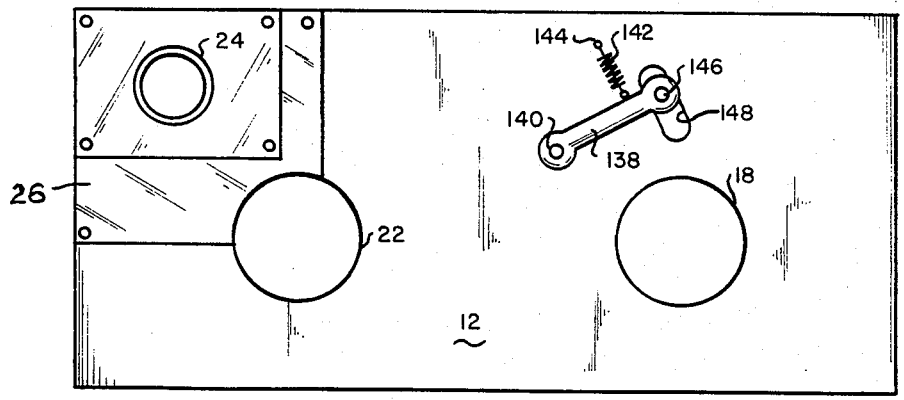

CARTRIDGE TAPE DRIVE HAVING VACUUM AUTO-THREADING

BACKGROUND OF THE INVENTION

1. Field of the Invention

The present invention relates to magnetic tape drives, and more particularly to a magnetic tape drive in which tape on a supply reel contained within a cartridge is automatically threaded onto a take-up reel using vacuum.

2. History of the Prior Art

It is known to provide a magnetic tape drive in which tape wound on a supply reel is automatically threaded onto a take-up reel using vacuum. An example of such a tap drive is provided by U.S. Pat. No. 4,243,186 of Peter et al. In the Peter et al patent tape from a supply reel is drawn by a vacuum-created air flow into and through a generally enclosed elongated flowpath extending between the supply reel and a take-up reel onto which the tape is eventually wound. The vacuum is provided by a vacuum source which is coupled to the flowpath via apertures in the hub mounting the take-up reel. The supply reel which is removable from the magnetic tape drive is installed by insertion through a slot in the front of the tape drive and disposition over a hub which includes reel centering and locking arrangements.

Other examples of magnetic tape drives in which magnetic tape wound upon a supply reel is automatically threaded onto a take-up reel using vacuum or other means for creating an air flow are provided by U.S. Pat. Nos. 3,863,863 of Ende, 3,127,120 of Selsted et al, 3,134,527 of Willis, 3,910,526 of Mosciatti and 3,795,371 of Tolini et al. The Selsted et al and Willis patents are like the Peter et al patent in that the magnetic tape drives disclosed therein provide automatic threading of the tape from the supply reel to the take-up reel exclusively by vacuum means.

Magnetic tape drives in which the supply reel is mounted within a cartridge removable from the tape drive have recently become very popular for various applications. In those applications it is highly advantageous to have the supply reel enclosed within a cartridge so that the cartridge as a single, integral unit can be easily installed in and removed from the magnetic tape drive. The cartridge encloses and protects the tape in addition to facilitating the use of different reels of tape within the tape drive. Within such cartridge tape drives it is highly desirable to provide automatic threading of the tape wound upon the supply reel within the cartridge. The tape is automatically threaded past the magnetic head assembly and onto the take-up reel mounted within the magnetic tape drive.

Cartridge tape drives are known in which the tape from the supply reel within the cartridge is automatically threaded using various mechanical arrangements. Such mechanical arrangements tend to be complex and expensive and in some cases of questionable reliability. Most such mechanical arrangements require that the leading end of the tape have some sort of mechanical element or leader attached thereto to enable the tape to be pulled from the cartridge and automatically fed to the take-up reel. Uniform winding of the tape onto the take-up reel is made difficult where such a mechanical element or leader is present.

Accordingly, it would be desirable to provide a cartridge tape drive in which automatic threading of the tape is accomplished by vacuum or other air flow creating means and without the need for a leader or other mechanical element on the tape. However, the prior art noted above which utilizes vacuum and similar automatic threading arrangements does not involve cartridges and therefore does not address the problem of designing a tape drive which accommodates tape cartridges and which also facilitates automatic threading by vacuum or similar means. In all of the patents noted above, the supply reel is placed on a supply reel hub by hand rather than having the supply reel contained within a cartridge with the cartridge being installed in the tape drive.

Accordingly, it would be desirable to provide a cartridge tape drive in which automatic threading is accomplished using a vacuum. It would furthermore be desirable to provide an improved tape cartridge for use in automatic threading operations using vacuum or other air flow producing means.

BRIEF DESCRIPTION OF THE INVENTION

The present invention provides a cartridge tape drive in which the tape is automatically threaded from a supply reel contained within a cartridge to a take-up reel by vacuum. With the cartridge installed on the base of the tape drive, a tape exit port in the edge of the cartridge is positioned at the upstream portion of a generally enclosed continuous flowpath extending past a magnetic head assembly to the take-up reel. A vacuum source is coupled to apertures in the hub of the take-up reel so that the vacuum is communicated through the flowpath and into the cartridge. One or more air intake ports, preferably located in an edge of the cartridge opposite the tape exit port, allow air from outside the cartridge to flow through the cartridge and through the tape exit port into the main part of the flowpath. The air flow pulls the leading end of a length of magnetic tape wound on the supply reel through the tape exit port and into the main part of the flowpath where the tape is pulled past the magnetic head assembly to the take-up reel. At the take-up reel the tape is wrapped around the apertured hub to complete the auto-threading operation.

At the beginning of an auto-threading operation following installation of the cartridge in the tape drive, the supply reel is rotatably driven in a second direction through at least several revolutions to ensure that the tape is completely wrapped around the pack thereof on the supply reel and the leading end of the tape is disposed adjacent the tape pack. Air flowing through the air intake ports in the edge of the cartridge is caused to flow around both sides of the supply reel, ensuring that the leading end of the tape is held adjacent the pack of tape on the supply reel and away from the inside walls of the cartridge housing. The direction of rotation of the supply reel is then reversed and the supply reel is rotated in a first direction opposite the second direction to begin unwinding tape from the reel. As unwinding of the tape is begun, the loose leading end of the tape is entrained into the air current flowing through the cartridge. The air current pulls the leading end of the tape through the tape exit port in the cartridge and then through the main part of the flowpath and onto the take-up reel as rotation of the supply reel in the first direction continues.

The flowpath is preferably provided with one or two additional air intake ports adjacent the outer periphery of the take-up reel to provide additional incoming air flows which aid in winding the leading end of the tape onto the hub of the take-up reel during the auto-threading operation. In a preferred embodiment two such air intake ports are disposed approximately 90° apart about the outer periphery of the take-up reel.

The take-up reel is preferably rotated in the second direction which is opposite the first direction in which the supply reel is rotated during unwinding of the tape therefrom. By rotating the supply reel in a direction opposite the take-up reel, the air inlet port can be located to assure a positive air flow and tape is unwound from the supply reel and fed into the flowpath in positive, highly reliable fashion.

The tape cartridge is provided with a door which extends along a portion of one edge of the cartridge to close off the tape exit port when the cartridge is removed from the tape drive. The door which is pivotably mounted along an axis at the end of the edge of the cartridge has an outer lobed portion thereof adapted to be engaged by a portion of the tape drive to pivot the door into an open position as the cartridge is installed in the tape drive. The base of the tape drive is provided with opposite grooves configured to receive flanges extending along the opposite sides of the cartridge as the cartridge is slid into place on the base of the tape drive. The cartridge is releasably held in the installed position by a spring-loaded pawl which is mounted at the top of the tape drive so as to drop into and engage a notch in one of the flanges of the cartridge.

With the tape cartridge installed in the tape drive, the supply reel within the cartridge is rotatably driven in a first arrangement by a motor mounted beneath the base and having a drive pulley mounted on the shaft thereof just above the base. An endless belt encircles the drive pulley and an opposite idler pulley rotatably mounted on a spring-loaded arrangement which normally urges the idler pulley in a direction away from the drive pulley. As the tape cartridge is slid into place on the base of the tape drive, a driven pulley at the bottom of the tape cartridge which is coupled to the supply reel engages the endless belt between the drive pulley and the idler pulley and moves the idler pulley toward the drive pulley against the resistance of the spring-loaded mounting arrangement so as to ensure positive engagement of the driven pulley by the endless belt.

In an alternative arrangement which provides a more direct drive of the supply reel by the drive motor, a driven toothed coupling coupled to the supply reel and extending from the bottom of the cartridge is engaged by a mating toothed drive coupling mounted on the motor shaft as the motor is moved upwardly by action of a spring coupled to a pivoted mount for the motor. Engagement of the driven coupling pushes the supply reel off the bottom of the cartridge housing against the resistance of a spring at the top of the cartridge to unlock the supply reel and ready it for rotation upon driving of the motor. Prior to removal of the cartridge from the tape drive, a solenoid is energized to rotate the pivoted motor mount downwardly against the resistance of the attached spring to release the drive coupling at the top of the motor shaft from the driven coupling at the bottom of the cartridge.

The vacuum source communicates with the apertured hub of the take-up reel by an arrangement which includes a motor driven blower rotor mounted within a block at the bottom of the base so as to exhaust air from an aperture in the block through a groove in the block. The aperture in the block communicates with a plenum formed in the base and communicating with the inside of the apertured hub of the take-up reel.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 6 is a right-rear perspective view of the tape drive of FIG. 1 with the tape cartridge removed to illustrate the manner in which the cartridge is installed in the tape drive;

FIG. 10 is a bottom view of the tape drive of FIG. 1;

FIG. 11 is a sectional view of a portion of the tape drive of FIG. 1 illustrating an arrangement for locking the tape cartridge in place on the tape drive;

FIG. 12 is a view of a portion of the bottom of the tape drive of FIG. 1 with the vacuum source and mounting block removed;

FIG. 13 is a sectional view taken along the line 13—13 of FIG. 12;

FIG. 14 is a plan view of a mounting block which is normally mounted over a portion of the tape drive shown in FIG. 12;

FIG. 15 is a side view of a vacuum source which is mounted in the mounting block of FIG. 14;

DETAILED DESCRIPTION

Figure 1:
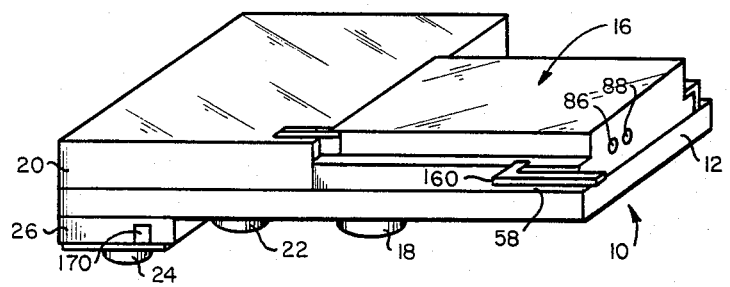
FIG. 1 is a right-front perspective view of a cartridge tape drive having vacuum auto-threading in accordance with the invention.

FIG. 1 depicts a cartridge tape drive 10 in accordance with the invention. The cartridge tape drive 10 includes a relatively thin, generally planar base 12 which forms a deck for the tape drive 10 and which may be mounted within a generally rectangular housing (not shown) to facilitate mounting and use of the tape drive 10.

The cartridge tape drive 10 as shown in FIG. 1 has a removable tape cartridge 16 mounted on the base 12. As described hereafter the tape cartridge 16 contains a supply reel which has a length of magnetic tape wound thereon and which is driven by a supply reel motor 18 mounted on the underside of the base 12.

The cartridge tape drive 10 includes a housing 20 mounted on the base 12 adjacent the tape cartridge 16. As described hereafter the housing 20 contains a take-up reel which is rotatably driven by a take-up reel motor 22 mounted on the underside of the base 12. The housing 20 also combines with the tape cartridge 16 to define a generally enclosed continuous flowpath extending between the supply reel within the tape cartridge 16 and the take-up reel within the housing 20. The tape wound on the supply reel within the tape cartridge 16 is automatically threaded through the generally enclosed continuous flowpath and onto the take-up reel within the housing 20 by vacuum from a vacuum source 24 disposed within a mounting block 26 mounted at the underside of the base 12. The vacuum from the vacuum source 24 is communicated to the hub of the take-up reel within the housing 20 in a manner which is described hereafter in connection with FIGS. 12—15.

Figure 2:
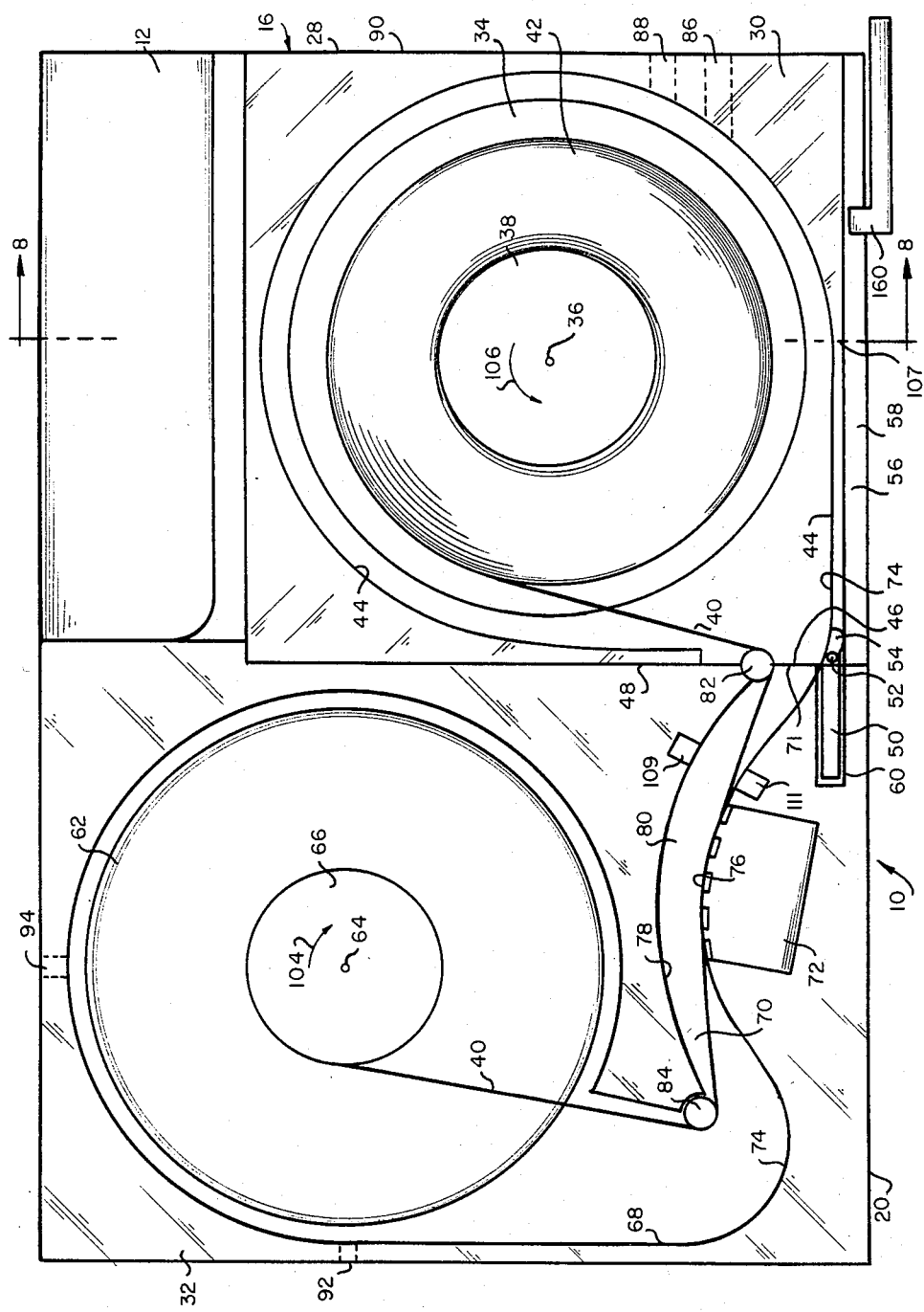
FIG. 2 is a top view of the tape drive of FIG. 1 showing a length of magnetic tape in a loaded position.

FIG. 2 is a top view of the cartridge tape drive 10 of FIG. 1. The tape cartridge 16 includes a generally rectangular housing 28 which is covered by a thin, planar top plate 30. The top plate 30 is of clear plastic or other transparent material so that the configuration of the rectangular housing 28 and the inside of the tape cartridge 16 can be plainly seen in FIG. 2. Similarly, the housing 20 mounted on the base 12 is covered with a clear top plate 32 so that the inside of the housing 12 can be seen in FIG. 2.

The tape cartridge 16 has a supply reel 34 mounted therein for rotation about a generally vertical axis 36. The supply reel 34 has a central hub 38 upon which is wound a length of magnetic tape 40. The length of magnetic tape 40 forms a tape pack 42 which is seen in FIG. 2 beneath the top of the supply reel 34. The supply reel 34 is made of generally transparent material in the present example to facilitate illustration of the tape pack 42 relative thereto.

The generally rectangular housing 28 of the tape cartridge 16 has a generally vertical interior wall 44 which encircles and is disposed relatively close to a substantial portion of the outer periphery of the supply reel 34. The opposite ends of the wall 44 converge to form a tape exit port 46 at a front edge 48 of the cartridge housing 28. The tape exit port 46 is covered by a door 50 which extends along a portion of the front edge 48 when the tape cartridge 16 is removed from the tape drive 10. The door 50 is rotatable about a pin 52 disposed within the cartridge housing 28 at the end of the front edge 48. The door 50 has a lobed portion 54 thereof which extends beyond the front edge 48 and which is engaged by a ridge 56 formed within a track 58 extending along a portion of the base 12 when the tape cartridge 16 is installed in the tape drive 10. Engagement of the lobed portion 54 of the door 50 by the ridge 56 swings the door 50 into an open position as shown in FIG. 2. When in the open position, the door 50 resides within a slot 60 in the housing 20 of the tape drive 10 so as to open the tape exit port 46.

The housing 20 of the tape drive 10 has a take-up reel 62 mounted therein for rotation about a generally vertical axis 64 parallel to the vertical axis 36 of the supply reel 34. The take-up reel 62 is constructed of generally transparent material in the present example so that a central hub 66 thereof is visible in FIG. 2. The housing 20 has a generally vertical interior wall 68 which encircles and is disposed relatively close to a substantial portion of the outer periphery of the take-up reel 62. The opposite ends of the wall 68 extend from the vicinity of the take-up reel 62 to the front edge 48 of the tape cartridge 16 to define a portion of a generally enclosed continuous flowpath 70. The portion of the flowpath 70 which is so defined terminates in an upstream end or portion 71 at the interface of the housing 20 and the front edge 48 of the cartridge 16. The flowpath 70 which is also partly formed by the interior wall 44 of the tape cartridge 16 extends from the supply reel 34 past a magnetic head assembly 72 to the take-up reel 62. The magnetic head assembly 72 is mounted within the housing 20.

The main part of the flowpath 70 is formed by an opposite pair of generally vertical side walls. A first such side wall 74 is formed by portions of the interior wall 44 of the tape cartridge 16 and the interior wall 68 of the housing 20 so as to extend between and be generally tangential to the supply reel 34 and the take-up reel 62. The first side wall 74 is generally continuous with an outer surface 76 of the magnetic head assembly 72 which contains a plurality of magnetic heads for read, write and erase operations. An opposite second side wall 78 of the flowpath 70 is formed by portions of the interior wall 44 of the tape cartridge 16 and the interior wall 68 of the housing 20. It was previously noted that the opposite ends of the interior wall 44 of the tape cartridge 16 converge at the front edge 48 to form the tape exit port 46. From the tape exit port 46 the flowpath 70 enters the housing 20 and forms a curved region 80 between a first tape roller guide 82 mounted within the second side wall 78 at the interface of the front edge 48 of the tape cartridge 16 and the housing 20 and a second tape roller guide 84 disposed within the second side wall 78 on the other side of the magnetic head assembly 72 from the first tape roller guide 82. The curved region 80 combines with the tape roller guides 82 and 84 to dispose the magnetic tape 40 over the outer surface 76 of the magnetic head assembly 72 when the magnetic tape 40 has been threaded from the supply reel 34 onto the take-up reel 62 as shown in FIG. 2.

As previously noted and as described in detail hereafter the vacuum source 24 creates a vacuum which is communicated up through the central hub 66 of the take-up reel 62 and through the flowpath 70. The vacuum creates air flows which enter the tape cartridge 16 through a pair of air inlet ports 86 and 88 in a back edge 90 of the generally rectangular housing 28 of the tape cartridge 16 opposite the front edge 48. The air flows entering the air inlet ports 86 and 88 extend around both sides of the supply reel 34 and as described hereafter are operative to initially insure that the outer end portion of the magnetic tape 40 is wrapped on the tape pack 42 and to thereafter feed the leading end of the magnetic tape 40 from the tape pack 42 through the tape exit port 46 and the curved region 80 to the region of the take-up reel 62. At the take-up reel 62 the magnetic tape 40 is guided onto the central hub 66 of the take-up reel 62 with the aid of a pair of air inlet ports 92 and 94 in the sides of the housing 20. The air inlet port 92 which is disposed adjacent the outer periphery of the take-up reel 62 provides an air flow from outside the housing 20 toward the central hub 66 to direct the magnetic tape 40 toward and then onto the central hub 66 as the magnetic tape 40 is being threaded onto the take-up reel 62. The air inlet port 94 which is approximately 90° removed from the air inlet port 92 around the outer periphery of the take-up reel 62 provides a further air flow from outside the housing 20 onto the central hub 66 to ensure that the magnetic tape 40 is secured around the central hub 66 as the tape 40 is threaded onto the take-up reel 62.

Figure 3:
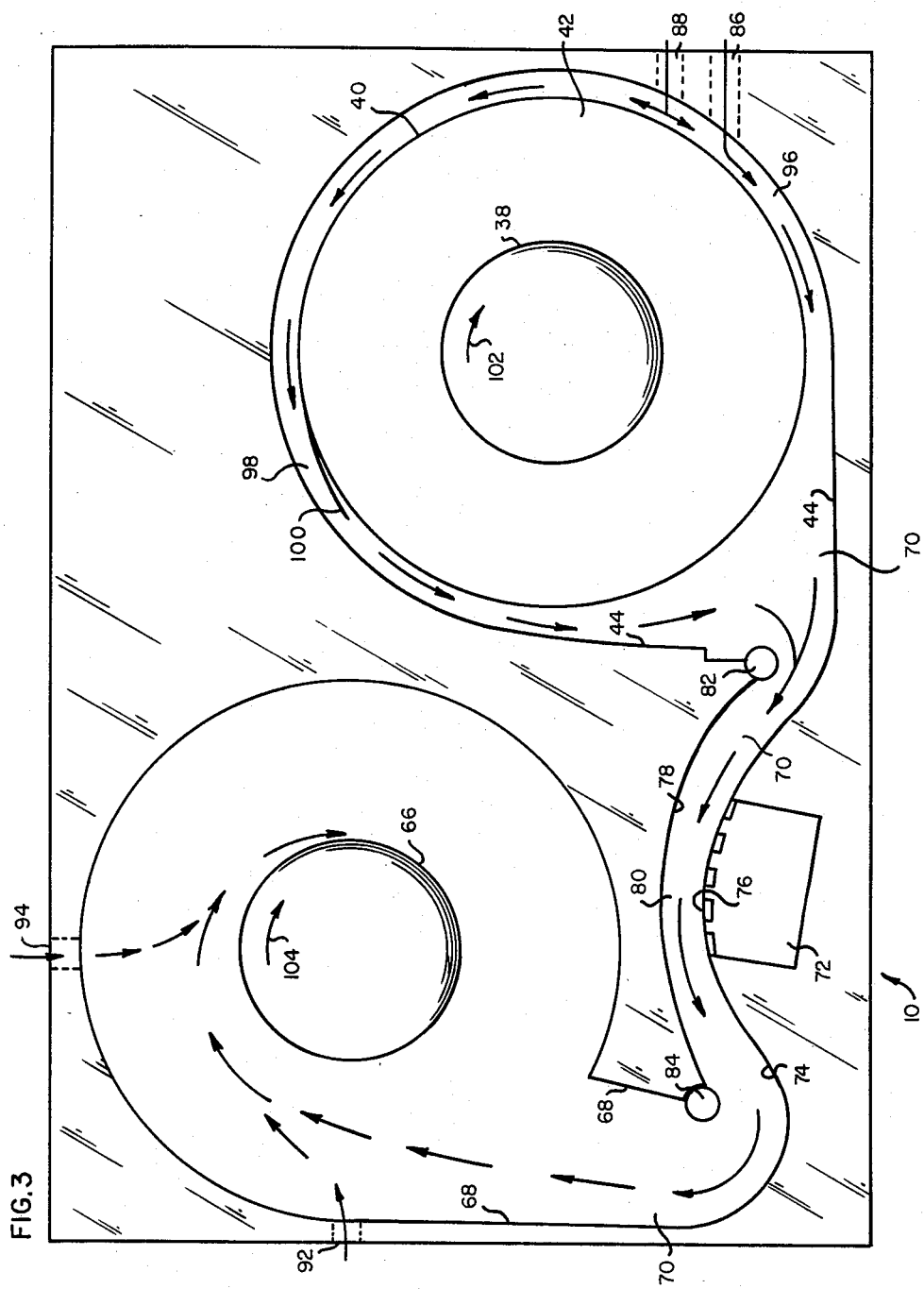
FIG. 3 is a modified top view of the tape drive of FIG. 1 showing the tape pack on the supply reel hub and the flowpath which extends between the supply reel and the take-up reel.

FIG. 3 illustrates the nature of the various air flows created by the vacuum at the central hub 66 of the take-up reel 62 in conjunction with the air inlet ports 86, 88, 92 and 94. In FIG. 3 the central hub 38 of the supply reel 34 is illustrated together with the tape pack 42, but the supply reel 34 is otherwise not illustrated for the sake of clarity. In the case of the take-up reel 62, only the central hub 66 thereof is illustrated in FIG. 3, again for clarity of illustration.

The basic air flow through the flowpath 70 originates at the air inlet ports 86 and 88 in the tape cartridge 16. As illustrated in FIG. 3 the air flow through the air inlet port 86 basically flows around a first side 96 of the tape pack 42 and then into the curved region 80. A small amount of the air flow through the air intake port 86 may flow around a second side 98 of the tape pack 42, but this is not illustrated in FIG. 3. The air flow through the air inlet port 88 divides between the first and second sides 96 and 98 repectively of the tape pack 42. The air flow around the second side 98 of the tape pack 42 joins the air flow around the first side 96 in the region of the tape roller guide 82 where the combined air flows continue through the curved region 80 of the flowpath 70.

In the present example the two air inlet ports 86 and 88 are utilized to provide air flows around the opposite sides 96 and 98 of the tape pack 42. In actual practice, however, such air flows can be provided using a single air inlet port or more than two air inlet ports depending upon design considerations.

Figure 4:
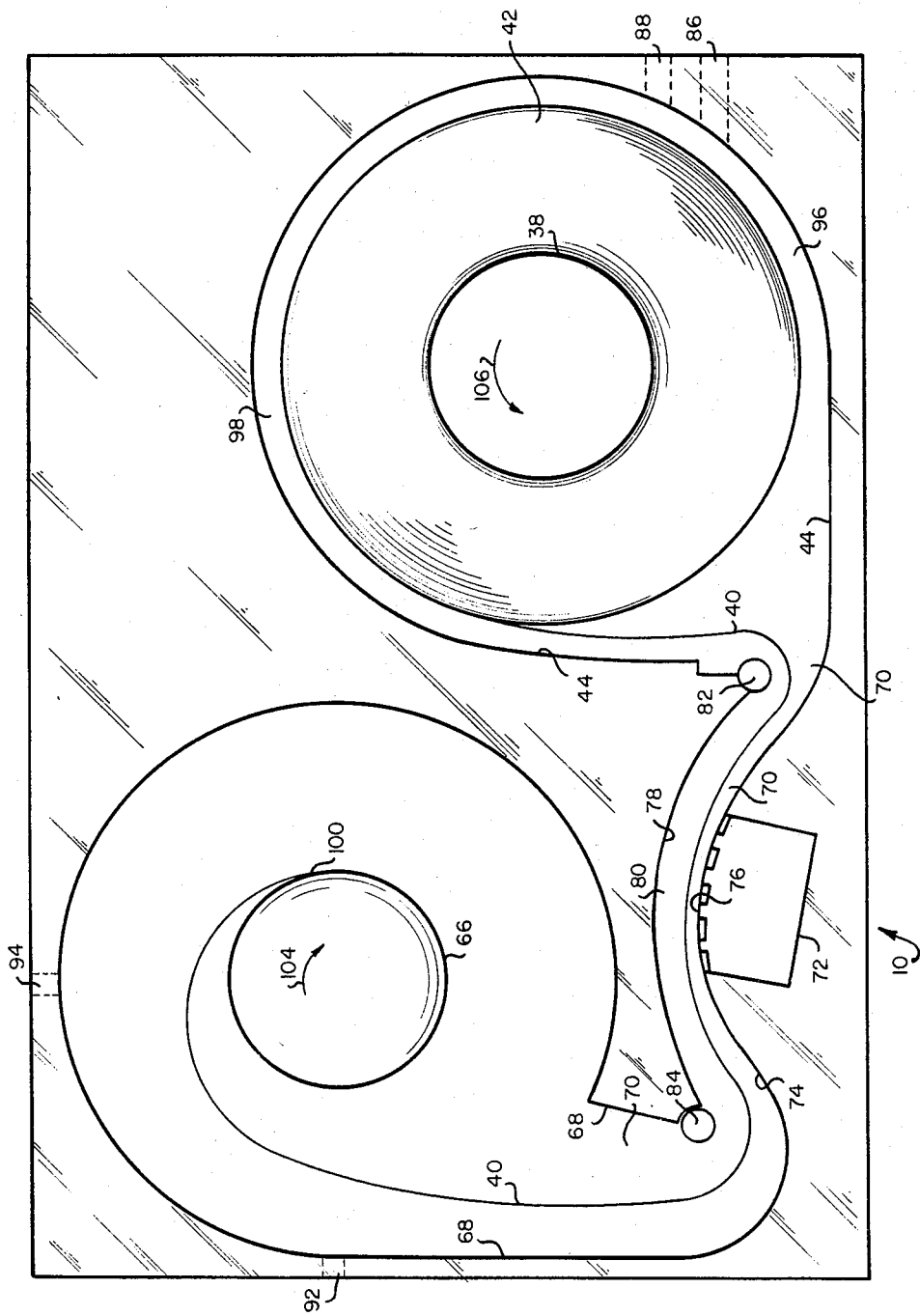
FIG. 4 is a top view of the tape drive of FIG. 1 similar to the view of FIG. 3 and showing the manner in which the length of magnetic tape forming the tape pack on the supply reel is automatically threaded by vacuum onto the take-up reel.

As described hereafter in connection with FIG. 4 the air flow around the first side 96 of the tape pack 42 is operative to peel a leading end 100 of the magnetic tape 40 from the tape pack 42 and begin feeding the leading end 100 into the curved region 80 of the flowpath 70. At the beginning of an auto-threading operation, however, the supply reel 34 is initially rotated a few turns in a second direction represented by an arrow 102 in FIG. 3. With the tape pack 42 rotated in the direction of the arrow 102, the air flow around the second side 98 of the tape pack 42 insures that the magnetic tape 40 is completely wound around the tape pack 42 and that the leading end 100 is disposed adjacent the tape pack 42 and away from the interior wall 144. This is important so that when the direction of rotation of the supply reel 34 is reversed from the direction shown by the arrow 102, the leading end 100 of the tape 40 can be separated from the tape pack 42 and fed into the curved region 80 of the flowpath 70 in a desired manner.

It was previously noted that the air flows around the opposite sides 96 and 98 of the tape pack 42 converge in the region of the tape roller guide 82 where they enter the curved region 80 of the flowpath 70. The air flows continue through the curved region 80 past the magnetic head assembly 72 and the tape roller guide 84 to the region of the central hub 66 of the take-up reel 62 where they are joined by air flows from the air inlet ports 92 and 94. During tape threading, as the leading end 100 of the tape 40 passes the tape roller guide 84 and moves into the vicinity of the central hub 66 of the take-up reel 62, it is important that the leading end 100 be directed onto the central hub 66 in rapid and direct fashion. If the leading end 100 is allowed to circle a large portion of the circumference of the central hub 66 before converging onto the outer surface of the central hub 66, then there is a tendency for the leading end 100 to form a loop which typically makes proper threading of the tape 40 onto the central hub 66 difficult or impossible. Rapid and direct movement of the leading end 100 of the tape 40 onto the central hub 66 is greatly aided by the air flows through the air inlet ports 92 and 94 which join the air flows from the curved region 80 of the flowpath 70 as such air flows encircle the central hub 66. The takeup reel 62 is rotated in the second direction during tape threading as shown by an arrow 104.

FIG. 4 is a view similar to FIG. 3. However, instead of illustrating the various air flows as in FIG. 3, FIG. 4 illustrates the manner in which the magnetic tape 40 is automatically threaded by vacuum from the supply reel 34 to the take-up reel 62. As described in connection with FIG. 3 the air flow through the air intake port 88 flows around the second side 98 of the tape pack 42 to ensure that the magnetic tape 40 is completely wound about the outside of the tape pack 42 with the leading end 100 thereof disposed adjacent the tape pack 42. This occurs during the initial portion of the auto-threading operation when the supply reel 34 is rotated several turns in the second direction illustrated by the arrow 102 in FIG. 3. When the supply reel 34 has been so rotated, the direction of rotation thereof is reversed by reversing the supply reel motor 18, and the supply reel 34 is then rotated in an opposite first direction as illustrated by an arrow 106 in FIG. 4 to begin unwinding the magnetic tape 40 from the tape pack 42. The air flows around the first and second sides 96 and 98 of the tape pack 42 guide the leading end 100 of the tape 40 past the tape roller guide 82 and into the curved region 80 as the supply reel 34 rotates in the first direction shown by the arrow 106. The air flow around the first side 96 of the tape pack 42 is operative to peel the leading end 100 from the tape pack 42. The particular arrangement illustrated has been found capable of peeling the leading end 100 of the tape 40 from the tape pack 42 and feeding it past the tape roller guide 82 in desired fashion for most rotational positions of the tape pack 42 when the direction of rotation of the supply reel 34 is reversed from the second direction to the first direction. Where reversal of reel direction occurs with the leading end 100 of the tape 40 in a region between the air intake ports 86 and 88 and a point 107 where the interior wall 44 becomes straight, the tape 40 may tend to form a loop therein adjacent the leading end 100 as the leading end 100 is fed to and then through the tape exit port 46 and this is undesirable. Where this is a problem it may be necessary to provide sensing means such as a device responsive to a small reflective strip at the leading end 100 of the tape 40 to insure that the supply reel 34 is not stopped and reversed with the leading end 100 in the troublesome region.

As the leading end 100 of the tape 40 is fed past the tape roller guide 82 and into the curved region 80 of the flowpath 70 by the air flows through the air inlet ports 86 and 88, continued rotation of the supply reel 34 causes the air flows to carry the leading end 100 through the curved region 80 past the magnetic head assembly 72 and the second tape roller guide 84. As the leading end 100 approaches the central hub 66 of the take-up reel 62, the air flows from the air inlet ports 86 and 88 combine with the air flows from the air inlet ports 92 and 94 at the outer periphery of the take-up reel 62 to direct the leading end 100 toward and then onto the central hub 66 as the leading end 100 begins to circle the central hub 66 as illustrated in FIG. 4. The take-up reel 62 which is rotated in the second direction illustrated by the arrow 104 is rotated at a rate much faster than the supply reel 34 is rotated in the first direction shown by the arrow 106. Consequently, as the leading end 100 of the magnetic tape 40 is directed onto the central hub 666 of the take-up reel 62, the magnetic tape 40 quickly wraps around the central hub 66 and the magnetic tape 40 is drawn taut across the tape roller guides 82 and 84 and over the outer surface 76 of the magnetic head assembly 72 so as to assume the position shown in FIG. 2.

It will be observed from FIGS. 2 and 4 that the tape drive 10 in which the supply reel 34 and the take-up reel 62 rotate in the opposite directions shown by the arrows 104 and 106 operates in a fashion contrary to conventional arrangements. In conventional arrangements in which the magnetic head assembly is disposed on the same side of the two reels rather than intermediate the two reels, the reels are typically rotated in the same direction. The departure of the tape drive 10 from conventional reel directions is occasioned largely by the problem of peeling the leading end 100 of the tape 40 from the tape pack 42 and feeding it through the flowpath 70. It has been found that if the magnetic tape 40 is wound on the supply reel 34 in the opposite direction from that shown in FIGS. 2–4, then the air intake ports 86 and 88 must be relocated at the side of the supply reel 34 in a region opposite the point 107 in order to provide air flows which will peel the leading end 100 of the magnetic tape 40 from the tape pack 42 and feed the leading end 100 toward the curved region 80 of the flowpath 70. It has been found that such relocation of the air intake ports 86 and 88 provides a much more indirect and less desirable air flow through the flowpath 70. In addition, the leading end 100 of the magnetic tape 40 has a tendency to jam in the region of the tape roller guide 82 as it attempts to enter the curved region 80. The leading end 100 will sometimes fail to directly enter the curved region 80 of the flowpath 70 until a loop in the tape is formed, whereupon the loop itself is pulled through the curved region 80. Such a loop is undesirable in that it prevents the leading end 100 of the tape 40 from being wound onto the central hub 66 of the take-up reel 62 in proper fashion.

Consequently, in the tape drive 10 the supply reel 34 is rotated in the first direction shown by the arrow 106 to unwind the magnetic tape 40 therefrom. At the same time the take-up reel 62 is rotated in the second direction shown by the arrow 104 to wind the magnetic tape 40 thereon. This results in the supply reel 34 moving in a first direction along the first side wall 74 of the flowpath 70 and the take-up reel 62 moving in an opposite second direction along the first side wall 74.

When the magnetic tape 40 has been threaded onto the take-up reel 62, the reels 34 and 62 are thereafter driven as desired to effect read, write or erase operations at the head assembly 72. A pair of infrared emitters 109 mounted within the second sidewall 78 within the curved region 80 of the flowpath 70 cooperate with an opposite pair of infrared sensors 111 mounted within the first sidewall 74 to sense when either end of an operative region along the magnetic tape 40 is reached. One emitter-sensor pair at the top of the emitters 109 and the sensors 111 senses a hole in the tape 40 denoting the beginning of the operative region following a threading portion following the leading end 100. The other emitter-sensor pair at the bottom of the emitters 109 and the sensors 111 senses a hole at the opposite end of the tape.

The emitters 109 and the sensors 111 are coupled to a servo circuit which controls the reel motors 18 and 22. Tape speed information is provided to the servo circuit by a tachometer (not shown) coupled to the tape roller guide 84. A microprocessor control within the servo circuit provides rotation of the reels 34 and 62 to effect autothreading. Completion of tape threading results in increased load on the take-up reel motor 22 with accompanying increased motor current. The current increase is sensed to determine that threading is complete.

Figure 5:
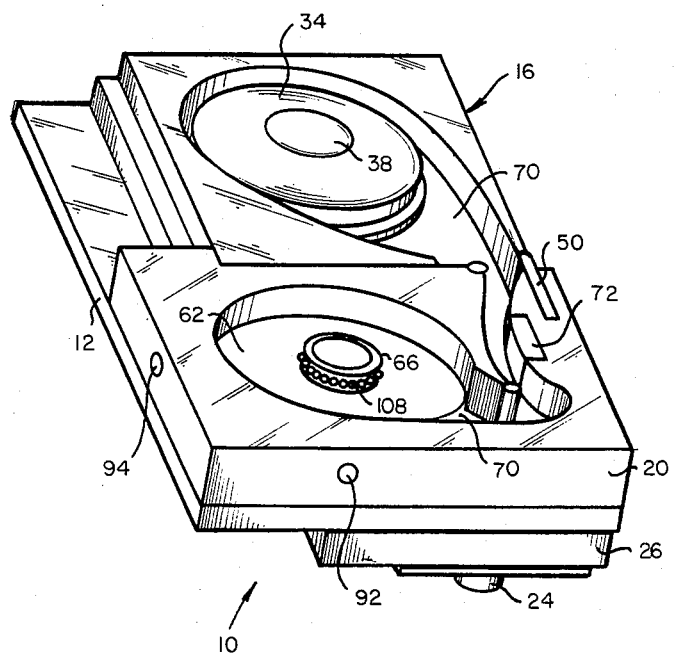
FIG. 5 is a left-rear perspective view of the tape drive of FIG. 1 with the top plates removed from the tape drive and tape cartridge.

The cartridge tape drive 10 is shown in FIG. 5 together with the tape cartridge 16. In the particular illustration of FIG. 5 the top plate 30 of the generally rectangular housing 28 of the tape cartridge 16, although transparent in the present example, has been removed together with the transparent top plate 32 of the housing 20 in order to better illustrate the continuous flowpath 70 between the supply reel 34 and the take-up reel 62. In addition, the top part of the take-up reel 62 is not shown in order that the central hub 66 of the take-up reel 62 is clearly visible. As shown in FIG. 5 the central hub 66 is provided with a plurality of apertures 108 around the circumference thereof. The vacuum source 24 communicates with the flowpath 70 through the apertures 108 of the central hub 66 as described hereafter in connection with FIGS. 12–15.

The manner in which the tape cartridge 16 is mounted on the base 12 of the cartridge tape drive 10 is perhaps best illustrated in FIG. 6. It was previously noted that a track 58 extends along a portion of the base 12. The track 58 has a groove 110 therein for receiving a flange 112 on a side edge of the housing 28 of the tape cartridge 16. An opposite flange 114 on the cartridge housing 28 is received within a groove 116 in a track 118. The track 118 extends along a portion of the base 12 and is disposed opposite and generally parallel to the track 58. The flanges 112 and 114 extend along the length of the tape cartridge 16 on the opposite side edges thereof between the front edge 48 and the back edge 90.

Installation of the tape cartridge 16 in the tape drive 10 is accomplished by inserting the flanges 112 and 114 into the grooves 110 and 116 in the tracks 58 and 118 respectively. The cartridge 16 is then pushed in a direction toward the housing 20, causing the flanges 112 and 114 to slide within the grooves 110 and 116 until the cartridge 16 assumes the installed position in which the front edge 48 thereof abuts the housing 20 as illustrated in FIGS. 1, 2 and 5. It was previously noted that the track 58 is provided with a ridge 56 at an upper portion thereof above the groove 110. As the flanges 112 and 114 are inserted in the grooves 110 and 116 and the cartridge is moved forward onto the tape drive 10, the lobed portion 54 of the door 50 engages the ridge 56 and the door 50 is pivoted about the pin 52 into an open position. As the cartridge 16 is moved forward so that the front edge 48 thereof engages the housing 20, the door 50 enters and thereafter resides within the slot 60. Upon removal of the cartridge 16 from the tape drive 10, the door 50 which has a small coil spring (not shown) coupled thereto in the region of the pin 52 is biased into the closed position shown in FIG. 7 so as to extend along a portion of the front edge 48 and close off the tape exit port 46.

FIG. 6 shows an arrangement for driving the supply reel 34 which includes a drive pulley 120 disposed just above the base 12 between the opposite tracks 58 and 118. The drive pulley 120 is mounted on the shaft of the supply reel motor 18 which as previously noted is mounted at the underside of the base 12. An idler pulley 122 is also mounted just above the base 12 between the tracks 58 and 118. The idler pulley 122 is spaced-apart from the drive pulley 120. An endless belt 124 encircles both the drive pulley 120 and the idler pulley 122. Operation of the supply reel motor 18 rotates the drive pulley 120 causing the endless belt 124 to move around the drive pulley 120 and the idler pulley 122. The moving belt 124 engages a driven pulley at the underside of the tape cartridge 16 to rotatably drive the supply reel 34.

Figure 7:
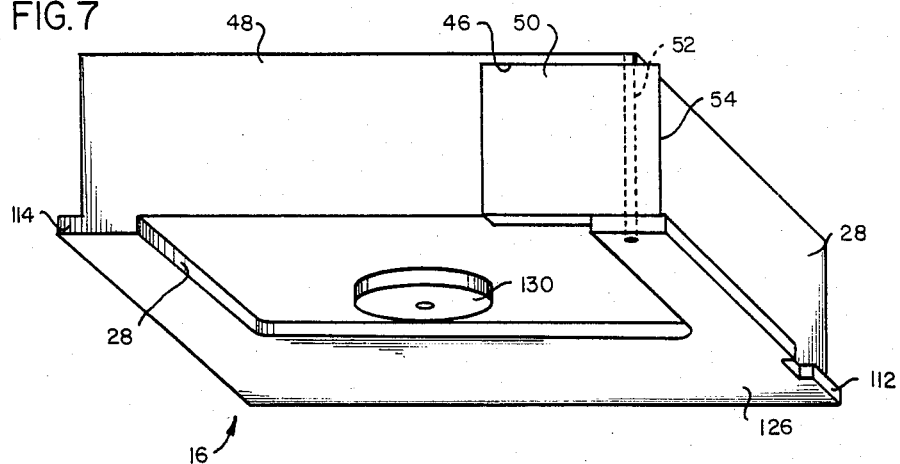
FIG. 7 is a different perspective view of the tape cartridge.
Figure 8:
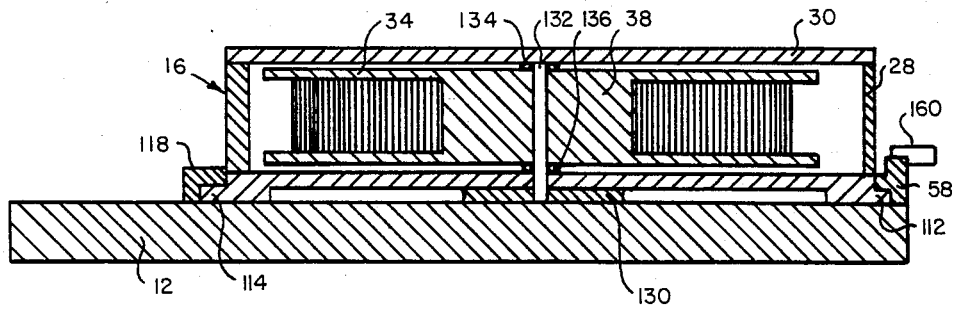
FIG. 8 is a sectional view of the tape cartridge and a portion of the tape drive of FIG. 1 taken along the line 8—8 of FIG. 2.

Referring to FIG. 7 it will be seen that the generally rectangular housing 28 of the tape cartridge 16 has a relatively flat, generally planar bottom 126 having a recess 128 therein. The recess 128 extends along the bottom 126 from the front edge 48 and accommodates a driven pulley 130 at a central region thereof. As shown in FIG. 8 the driven pulley 130 is mounted on the lower end of a shaft 132 which extends into the housing 28 and mounts the central hub 38 of the supply reel 34 thereon. The shaft 132 is journaled for rotation within the generally rectangular housing 28 of the tape cartridge 16 by an upper bearing 134 and a lower bearing 136. With the tape cartridge 16 installed in the tape drive 10, the driven pulley 130 within the recess 128 resides just above the top of the base 12. Rotation of the driven pulley 130 rotates the supply reel 34 within the tape cartridge 16.

Figure 9:
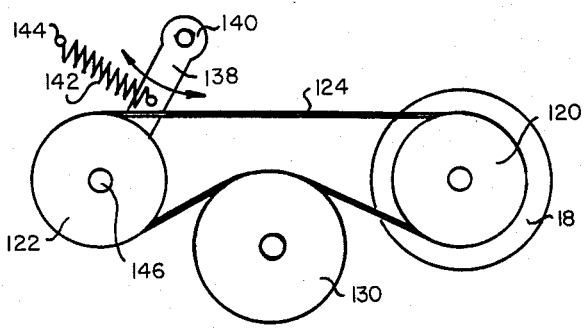
FIG. 9 is a top view of one arrangement for rotatably driving the supply reel within the tape cartridge.

When the tape cartridge 16 is installed in the tape drive 10, the flanges 112 and 114 are inserted in the grooves 110 and 116 in the opposite tracks 58 and 118 respectively. As the cartridge 16 is pushed forward onto the tape drive 10, the driven pulley 130 at the bottom of the tape cartridge 16 engages a portion of the endless belt 124 encircling the drive pulley 120 and the idler pulley 122. As the tape cartridge 16 is pushed forward so as to position the front edge 48 thereof against the housing 20, the continued forward motion of the driven pulley 130 at the bottom of the tape cartridge 16 causes the idler pulley 122 to move toward the drive pulley 120, allowing the belt 124 to wrap around a portion of the driven pulley 130. This is illustrated in FIG. 9 which shows that the idler pulley 120 is rotatably mounted on one end of an arm 138 having an opposite end 140 thereof pivotally coupled to the underside of the base 12. A coil spring 142 has one end thereof coupled to an intermediate portion of the arm 138 and an opposite end thereof coupled to a pin 144 on the underside of the base 12. The arm 138 is capable of pivoting about the end 140 thereof against the resistance of the spring 142. The spring 142 normally pulls the arm 138 and the attached idler pulley 122 in a direction away from the drive pulley 120 so as to maintain the belt 124 in a taut condition when the tape cartridge 16 is removed from the tape drive 10. When the cartridge 16 is inserted into position on the tape drive 10, the driven pulley 130 at the bottom of the cartridge 16 engages the belt 124. The arm 138 pivots toward the drive pulley 120 against the resistance of the spring 142, allowing the belt 124 to wrap around the driven pulley 130 as the driven pulley 130 enters the region between the drive pulley 120 and the idler pulley 122.

FIG. 9 shows the relative positions of the belt 124, the arm 138 and the pulleys 120, 122 and 130 when the tape cartridge 16 is in the installed position with the front edge 48 thereof abutting the housing 20. The base 12 has been omitted from FIG. 9 in order to show the arm 138 and the spring 142 together with the idler pulley 122. As shown in FIG. 10 the end 140 of the arm 138 is pivotally coupled to the underside of the base 12. The pin 144 to which one end of the coil spring 142 is coupled is mounted on the underside of the base 12. The idler pulley 122 which resides just above the top surface of the base 12 is mounted on a shaft 146 which extends through a slot 148 in the base 12 to the arm 138. The slot 148 accommodates the shaft 146 as the arm 138 pivots about the end 140 thereof.

With the tape cartridge 16 in the installed position in the tape drive 10, the elasticity of the endless belt 124 and the resiliency of the spring 142 exert a force on the driven pulley 130 at the bottom of the tape cartridge 16 in a direction to tend to push the tape cartridge 16 out of the installed position. The cartridge 16 is locked in the installed position against this urging by an arrangement which is shown in FIG. 11 and which includes a pawl 150 disposed within a cavity 151 in the track 58. The pawl 150 is pivotally coupled to the wall of the cavity 151 within the track 158 at a first end 152 thereof and has an opposite second end 154 adapted to move into and engage a notch 156 in the flange 112 of the tape cartridge 16 under the urging of a spring 158 as the cartridge 16 is moved into the installed position. The spring 158 resides between the top of the pawl 150 and the top of the cavity 151. The second end 154 of the pawl 150 which normally resides within the groove 110 in the track 58 when the cartridge 16 is removed from the tape drive 10 is pivoted upwardly and onto the top of the flange 112 against the resistance of the spring 158 when installation of the tape cartridge 16 is begun. As the tape cartridge 16 reaches the installed position with the front edge 48 thereof abutting the housing 20, the notch 156 in the flange 112 moves into position under the second end 154 of the pawl 150. The second end 154 drops into the notch 156 under the urging of the spring 158 to lock the tape cartridge 16 in the installed position.

Release of the tape cartridge 16 for removal from the tape drive 10 is accomplished by lifting upwardly on a handle 160 which is formed at the top of the pawl 150 above the second end 154 and which extends through a slot 162 at the top of the track 58 so as to principally reside on the outside of the track 58. This pulls the second end 154 of the pawl 150 out of the notch 156, allowing the tape cartridge 16 to be removed by manually sliding the cartridge 16 out of the tape drive 10

The details of the arrangement for creating a vacuum at the central hub 66 of the take-up reel 62 are shown in FIGS. 12-15. As previously noted in connection with FIG. 5, the central hub 66 is provided with a plurality of apertures 108 located around the circumference thereof. The interior of the central hub 66 is hollow and communicates with a cavity in the bottom surface of the base 12 forming a plenum 164 as shown in FIG. 12. The plenum 164 communicates with the interior of the central hub 66 via a circular aperture 166 in the base 12 located below the central hub 66. A shaft 168 extends upwardly from the take-up reel motor 22 (shown in FIG. 1) through the circular aperture 166 to mount the take-up reel 62.

It will therefore be seen from FIGS. 12 and 13 that a vacuum communicated to the plenum 164 is communicated through the circular aperture 166 into the hollow interior of the central hub 66 from which it communicates through the apertures 108 to the flowpath 70. The space between the bottom of the take-up reel 62 and the top of the base 12 is relatively small and air flow therethrough is minimal. A vacuum is provided within the plenum 164 by the mounting block 126 which is shown in dotted outline in FIGS. 12 and 13 and in detail in FIG. 14. As shown by the dotted outline in FIG. 12, the mounting block 26 is positioned against the bottom surface of the base 12 so as to cover the plenum 164. As shown in FIG. 14 the mounting block 26 has a groove 170 therein which extends into the block 26 from an outer edge of the block to a generally circular recess 172 within the block 26. The block 26 has a circular aperture 174 therein at the bottom of the circular recess 172, which aperture 174 communicates with the plenum 164.

The vacuum source 24 shown in FIG. 15 has a motor 176 mounted on a thin, planar plate 178 so as to drive a blower rotor 180 disposed on the opposite side of the plate 178 from the motor 176. When the vacuum source 24 is installed on the mounting block 26, the plate 178 resides on the mounting block 26 so as to cover the circular recess 172 and the groove 170. The blower rotor 180 resides within the circular recess 172. Rotation of the blower rotor 180 by the motor 176 creates air flows through the air inlet ports 86, 88, 92 and 94 and through the flowpath 70 as previously described. The various air flows which combine at the central hub 66 of the take-up reel 62 enter the hub 66 via the apertures 108. From the hollow interior of the central hub 66 the air flows continue through the circular aperture 166 and into the plenum 164. From the plenum 164 the air flows continue through the circular aperture 174 in the mounting block 26 to the blower rotor 180. The blower rotor 180 draws the air flows through the groove 170 to the exterior of the tape drive 10.

One particular arrangement for driving the supply reel 34 within the tape cartridge 16 was previously described in connection with FIGS. 6–10. An alternative arrangement for driving the supply reel 34 is shown in FIGS. 16 and 17.

Figure 16:
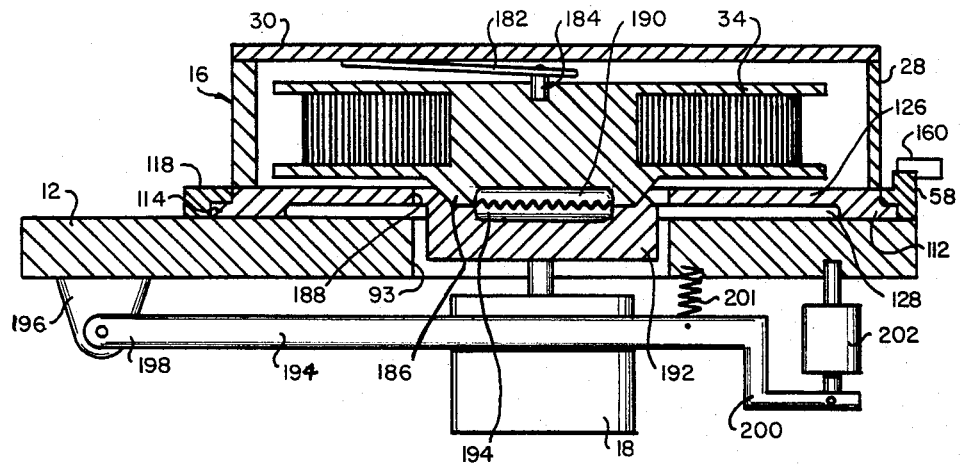
FIG. 16 is a sectional view of the tape cartridge and a portion of the tape drive of FIG. 1 which is similar to FIG. 8 but which illustrates an alternative arrangement for rotatably driving the supply reel within the tape cartridge.
Figure 17:
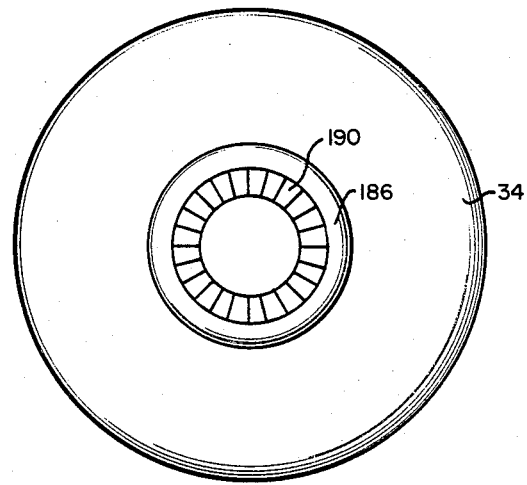
FIG. 17 is a bottom view of the supply reel of FIG. 16.

The tape cartridge 16 shown in FIG. 16 is of similar construction to the tape cartridge 16 previously described with several exceptions. One such exception relates to the fact that in the arrangement of FIG. 16, the height of the generally rectangular housing 28 of the cartridge 16 is slightly greater so as to accommodate a leaf spring 182 mounted on the underside of the top plate 30 and having an aperture in the free end thereof which receives a pin 184. The pin 184 is mounted within the top of the supply reel 34 at the center thereof. A further difference in the arrangement of FIG. 16 relates to the bottom of the supply reel 34 which has a downwardly extending toothed driven coupling 186 at a central portion thereof. The driven coupling 186 extends through a circular aperture 188 in the bottom 126 of the rectangular cartridge housing 28 and into the recess 128 below. As shown in FIG. 17 which is a bottom view of the supply reel 34, the toothed driven coupling 186 has a plurality of teeth 190 extending about the circumference thereof.

The toothed driven coupling 186 is adapted to be matingly engaged by a toothed drive coupling 192 mounted on the shaft of the supply reel motor 18 and residing within a circular aperture 193 in the base 12. The toothed driven coupling 192 is provided with a circumferential array of teeth 194 which mesh with the teeth 190 of the drive coupling 186 at the bottom of the supply reel 34 when the drive coupling 192 engages the driven coupling 186. Engagement and disengagement of the couplings 186 and 192 is controlled by a pivotable mounting arrangement for the supply reel motor 18 which includes an elongated frame 194 pivotally coupled to a bracket 196 mounted on the underside of the base 12 at a first end 198 thereof and mounting the motor 18 thereon adjacent an opposite second end 200 thereof A coil spring 201 coupled between the second end 200 of the elongated frame 194 and the bottom of the base 12 normally urges the second end 200 of the frame 194 in an upward direction to maintain engagement of the driven coupling 186 at the underside of the supply reel 34 by the drive coupling 192. Disengagement of the couplings 186 and 192 is provided by a solenoid 202 mounted so as to extend between the second end 200 of the elongated frame 194 and the underside of the base 12. When the cartridge 16 is to be removed from the tape drive 10, the solenoid 202 is energized so as to overcome the force of the spring 201 and move the second end 200 of the elongated frame 194 downwardly. This disengages the drive coupling 192 from the driven coupling 186, enabling the tape cartridge 16 to thereafter be removed from the tape drive 10 by lifting of the handle 160. When the tape cartridge 16 is again installed in the tape drive 10, the solenoid 202 is de-energized allowing the spring 201 to pull the second end 200 out of the elongated frame 194 upwardly and thereby providing engagement of the drive coupling 192 with the driven coupling 186.

The reel driving arrangement of FIGS. 16 and 17 comprises a somewhat more direct drive than the arrangement previously shown and described in connection with FIGS. 6–10. It eliminates the need for bearings, and in addition provides a means of locking the supply reel 34 within the tape cartridge 16 when the cartridge 16 is not in use. When the drive coupling 192 is uncoupled from the driven coupling 186, the resiliency of the leaf spring 182 pushes the supply reel 34 downwardly onto the upper surface of the bottom 126 of the generally rectangular housing 28. This prevents rotation of the supply reel 34. When the tape cartridge 16 is installed in the tape drive 10 and the solenoid 202 is de-energized, the resulting upward movement of the second end 200 of the elongated frame 194 under the urging of the spring 201 engages the drive coupling 192 with the driven coupling 186 and thereafter lifts the supply reel 34 off the bottom 126 of the rectangular housing 28 against the resistance of the leaf spring 182 so as to assume the position shown in FIG. 16 in which the supply reel 34 is free to be rotated by the motor 18.

It was previously noted that the tape drive 10 can be mounted within a generally rectangular housing (not shown) to facilitate mounting of the drive 10 within a limited space in a rack of different components. The front of such a housing can be provided with appropriate controls for the tape drive 10 including the cartridge release handle 160 which can be made to extend through a slot therein. The front of the housing can also be provided with a large slot to accommodate insertion and removal of the tape cartridge 16.

While the invention has been particularly shown and described with reference to a preferred embodiment thereof, it will be understood by those skilled in the art that various changes in form and details may be made therein without departing from the spirit and scope of the invention.

What is claimed is:

1. An auto-threading magnetic tape drive for use with a removable tape cartridge comprising:
   a base;
   a take-up reel rotatably mounted on the base;
   a magnetic head assembly mounted on the base;
   means defining a generally enclosed continuous flowpath along the base between an upstream portion of the flowpath and the take-up reel and extending past the magnetic head assembly;
   a cartridge having a generally enclosed housing and a supply reel mounted within and enclosed by the housing, the supply reel having a length of magnetic tape wound thereon and terminating in a leading end, the housing having a tape exit port through which the leading end of the length of magnetic tape may exit the housing and an air intake port located adjacent a portion of the supply reel which is generally opposite the tape exit port and open to the outside of the cartridge;
   means for releasably mounting the cartridge on the base with the tape exit port at the upstream portion of the flowpath;
   means mounted on the base for selectively rotating the supply reel and the take-up reel; and
   vacuum means for drawing air through the air intake port and through the housing, the tape exit port and the flowpath to pull the leading end of the length of tape from the supply reel to the take-up reel as the supply reel is rotated by the means for selectively rotating to unwind the tape therefrom.

2. An auto-threading magnetic tape drive for use with a removable tape cartridge comprising:
   a base;
   a take-up reel rotatably mounted on the base;
   a magnetic head assembly mounted on the base;
   means defining a generally enclosed continuous flowpath along the base between an upstream portion of the flowpath and the take-up reel and extending past the magnetic head assembly;
   a cartridge having a generally enclosed housing and a supply reel mounted within the housing, the supply reel having a length of magnetic tape wound thereon and terminating in a leading end, the housing having a tape exit port through which the leading end of the length of -magnetic tape may exist the housing and an air intake port;
   means for releasably mounting the cartridge on the base with the tape exit port at the upstream portion of the flowpath;
   means mounted on the base for selectively rotating the supply reel and the take-up reel; and
   vacuum means for drawing air through the air intake port and through the housing, the tape exit port and the flowpath to pull the leading end of the length of tape from the supply reel to the take-up reel as the supply reel is rotated by the means for selectively rotating to unwind the tape therefrom;
   the housing of the cartridge having a pivotable door therein, the door covering the tape exit port when the cartridge is not mounted on the base and being operative to pivot away from and open the tape exit port to the upstream portion of the flowpath when the cartridge is mounted on the base by the means for releasably mounting.

3. The invention set forth in claim 1, wherein the means for selectively rotating is operative to rotate the supply reel in an opposite direction from the take-up reel when the length of magnetic tape on the supply reel is being unwound from the supply reel and wound onto the take-up reel.

4. An auto-threading magnetic tape drive for use with a removable tape cartridge comprising:
   a base;
   a take-up reel rotatably mounted on the base;
   a magnetic head assembly mounted on the base;
   means defining a generally enclosed continuous flowpath along the base between an upstream portion of the flowpath and the take-up reel and extending past the magnetic head assembly;
   a cartridge having a generally enclosed housing and a supply reel mounted within the housing, the supply reel having a length of magnetic tape wound thereon and terminating in a leading end, the housing having a tape exit port through which the leading end of the length of magnetic tape may exit the housing and an air intake port;
   means for releasably mounting the cartridge on the base with the tape exit port at the upstream portion of the flowpath;
   means mounted on the base for selectively rotating the supply reel and the take-up reel; and
   vacuum means for drawing air through the air intake port and through the housing, the tape exit port and the flowpath to pull the leading end of the length of tape from the supply reel to the take-up reel as the supply reel is rotated by the means for selectively rotating to unwind the tape therefrom;
   the means for selectively rotating the supply reel and the take-up reel including a motor coupled to the base, a drive pulley mounted on the motor, an idler pulley movably mounted on the base, means normally biasing the idler pulley for movement in a direction away from the drive pulley, an endless belt encircling the drive pulley and the idler pulley, and a driven pulley disposed at the bottom of the housing of the cartridge and coupled to the supply reel, the driven pulley being operative to engage the endless belt between the drive pulley and the idler pulley when the cartridge is mounted on the base by the means for releasably mounting so as to be driven by the motor via the drive pulley and the endless belt.

5. An auto-threading magnetic tape drive for use with a removable tape cartridge comprising:
   a base;
   a take-up reel rotatably mounted on the base;
   a magnetic head assembly mounted on the base;
   means defining a generally enclosed continuous flowpath along the base between an upstream portion of the flowpath and the take-up reel and extending past the magnetic head assembly;
   a cartridge having a generally enclosed housing and a supply reel mounted within the housing, the supply reel having a length of magnetic tape wound thereon and terminating in a leading end, the housing having a tape exit port through which the leading end of the length of magnetic tape may exit the housing and an air intake port;
   means for releasably mounting the cartridge on the base with the tape exit port at the upstream portion of the flowpath;
   means mounted on the base for selectively rotating the supply reel and the take-up reel; and
   vacuum means for drawing air through the air intake port and through the housing, the tape exit port and the flowpath to pull the leading end of the length of tape from the supply reel to the take-up reel as the supply reel is rotated by the means for selectively rotating to unwind the tape therefrom; the means for selectively rotating the supply reel and the take-up reel including a motor having a shaft, means for pivotably coupling the motor to the base beneath the cartridge for upward and downward movement, a drive coupling mounted on the motor shaft, a driven coupling disposed at the bottom of the housing of the cartridge and coupled to the supply reel and means for selectively providing upward and downward movement of the means for pivotably coupling to provide engagement of and disengagement of the driven coupling by the drive coupling.

6. The invention set forth in claim 5, further including resilient means disposed between and coupling the supply reel to an inside top surface of the housing of the cartridge, the resilient means being operative to bias the supply reel into contact with an inside bottom surface of the housing of the cartridge to prevent rotation of the supply reel when the drive coupling is disengaged from the driven coupling.

7. The invention set forth in claim 1, wherein the means for selectively rotating includes means for initially rotating the supply reel in a first direction when the cartridge is mounted on the base by the means for releasably mounting to ensure that the length of magnetic tape is completely wound on the supply reel and means for thereafter rotating the supply reel in a second direction opposite the first direction to allow air drawn through the air intake port by the vacuum means to pull the leading end of the length of the tape from the supply reel to the take-up reel.

8. The invention set forth in claim 1, wherein the air intake port is located so that air drawn through the air intake port by the vacuum means is caused to flow around both sides of the supply reel in a direction from the air intake port to the tape exit port before flowing through the tape exit port and into the flowpath.

9. A magnetic tape cartridge for use with a magnetic tape drive having vacuum operated automatic tape threading comprising:
   a generally enclosed housing having a pair of opposite edges:
   a supply reel mounted within the housing and having a generally circular outer periphery;
   a door located within a portion of the housing adjacent the generally circular outer periphery of the supply reel, the door being selectively movable into an open position to provide a tape exit port in the housing;
   an air inlet port in a portion of the housing adjacent the generally circular outer periphery of the supply reel and spaced-apart from the door, the air inlet port being operative to cause air to flow into and through the housing and around a portion of the supply reel when the door is moved into an open position and the tape exit port is coupled to a vacuum source;
   the door extending along a portion of one of the pair of opposite edges of the housing, being mounted to pivot along an axis at the end of the one of the pair of opposite edges and having a lobed portion thereof extending beyond the axis at the end of the pair of opposite edges and adapted to pivot the door into an open position when engaged.

10. A magnetic tape cartridge for use with a magnetic tape drive having vacuum operated automatic tape threading comprising:
    an enclosed housing;
    a supply reel mounted within and substantially completely enclosed within an interior of the housing and having a generally circular outer periphery;
    a door located within a portion of the housing adjacent the generally circular outer periphery of the supply reel, the door being selectively movable into an open position to provide a tape exit port in the housing; and
    an air inlet port in a portion of the housing adjacent the generally circular outer periphery of the supply reel and spaced-apart from the door, the air inlet port being operative to cause air to flow into and through the housing and around a portion of the supply reel in response to the door being moved into an open position to couple a vacuum source to the interior of the housing via the tape exit port.

11. The invention set forth in claim 10, wherein the housing has a pair of opposite edges, the door extends along a portion of one of the pair of opposite edges and further including means for pivotally mounting the door along an axis at the end of the one of the pair of opposite edges.

12. The invention set forth in claim 11, wherein the air inlet port is disposed within the other one of the pair of opposite edges opposite the door and the one of the pair of opposite edges.

13. An auto-threading magnetic tape drive comprising:
    a base;
    a supply reel mounted on the base for rotation about a first axis, the supply reel having a length of magnetic tape wound thereon and terminating in a leading end;
    a take-up reel mounted on the base for rotation about a second axis generally parallel to the first axis;
    a magnetic head assembly mounted on the base;
    means defining a generally enclosed continuous flowpath along the base between the supply reel and the take-up reel and extending past the magnetic head assembly;
    vacuum means for drawing air through the flowpath from the supply reel to the take-up reel to pull the leading end of the tape from the supply reel to the take-up reel as the supply reel is rotated to unwind the length of tape therefrom; and
    means for rotatably driving the supply reel in a first direction to unwind the length of tape therefrom and for simultaneously rotatably driving the take-up reel in a second direction opposite the first direction to wind the length of tape from the supply reel thereon.

14. The invention set forth in claim 13, wherein the flowpath surrounds and generally encloses the supply reel at one end thereof and surrounds and generally encloses the take-up reel at an opposite second end thereof, and further including an air inlet port adjacent the supply reel at a portion of the supply reel opposite the flowpath for permitting air outside the magnetic tape drive to be drawn past the supply reel and into the flowpath to pull the leading end of the length of tape from the supply reel to the take-up reel.

15. The invention set forth in claim 14, wherein the take-up reel has a hub having at least one aperture therein and the vacuum means comprises a vacuum source coupled to the at least one aperture in the hub.

16. The invention set forth in claim 15, further including a second air inlet port adjacent the take-up reel for permitting air outside the magnetic tape drive to be drawn into the flowpath adjacent the take-up reel to aid in winding the length of tape from the supply reel onto the take-up reel.

17. The invention set forth in claim 16, further including a third air inlet port adjacent the take-up reel for permitting air outside the magnetic tape drive to be drawn into the flowpath adjacent the take-up reel to aid in winding the length of tape from the supply reel onto the take-up reel, the third air inlet port being approximately 90° removed from the second air inlet port around the outer periphery of the take-up reel.

18. The invention set forth in claim 13, wherein the flowpath has opposite, spaced-apart first and second side surfaces, the first side surface being generally tangential to both the supply reel and the take-up reel, the supply reel moving past the first side surface in one direction along the length of the first side surface when rotatably driven in the first direction to unwind the length of tape therefrom, and the take-up reel moving past the first side surface in a direction opposite said one direction along the length of the first side surface when driven in the second direction to wind the length of tape from the supply reel thereon.

19. The invention set forth in claim 18, further including a first tape roller guide disposed within the second side surface adjacent the supply reel and a second tape roller guide disposed within the second side surface adjacent the take-up reel, and wherein the magnetic head assembly resides within the first side surface between the first and the second tape roller guides.

20. The invention set forth in claim 19, wherein the means for rotatably driving is operative to initially drive the supply reel in the second direction to insure that the length of magnetic tape is completely wound on the supply reel and to thereafter drive the supply reel in the first direction to unwind the length of tape therefrom.

* * * * *